United States Patent
Kaieda

(10) Patent No.: US 12,388,931 B2
(45) Date of Patent: Aug. 12, 2025

(54) RECEPTION CONTROL APPARATUS, RECEPTION SYSTEM, CONTROL METHOD, AND CONTROL PROGRAM

(71) Applicant: NEC Platforms, Ltd., Kawasaki (JP)

(72) Inventor: Noboru Kaieda, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 34 days.

(21) Appl. No.: 18/271,587

(22) PCT Filed: Dec. 21, 2021

(86) PCT No.: PCT/JP2021/047330
§ 371 (c)(1),
(2) Date: Jul. 10, 2023

(87) PCT Pub. No.: WO2022/153802
PCT Pub. Date: Jul. 21, 2022

(65) Prior Publication Data
US 2024/0314243 A1 Sep. 19, 2024

(30) Foreign Application Priority Data
Jan. 15, 2021 (JP) ................. 2021-004627

(51) Int. Cl.
*H04M 3/58* (2006.01)
*H04M 3/46* (2006.01)

(52) U.S. Cl.
CPC ............ *H04M 3/58* (2013.01); *H04M 3/465* (2013.01); *H04M 2203/2072* (2013.01)

(58) Field of Classification Search
None
See application file for complete search history.

(56) References Cited

U.S. PATENT DOCUMENTS

2003/0030540 A1* 2/2003 Hom .............. G07C 9/00817
340/5.2
2014/0253285 A1* 9/2014 Menzel .............. G07C 9/215
340/5.7

(Continued)

FOREIGN PATENT DOCUMENTS

JP 2004-312513 A 11/2004
JP 2007-174003 A 7/2007

(Continued)

OTHER PUBLICATIONS

International Search Report for PCT Application No. PCT/JP2021/047330, mailed on Mar. 15, 2022.

*Primary Examiner* — Hemant S Patel
(74) *Attorney, Agent, or Firm* — Sughrue Mion, PLLC

(57) ABSTRACT

A reception control apparatus (10) accommodates a plurality of terminal apparatuses (20) to be used by each of a plurality of users and a reception apparatus (30) receiving a visitor, and includes a scheduled visit database (11) that can be registered by associating authentication information of a scheduled visitor with the user, an acquisition unit (12) acquiring authentication information of a visitor from the reception apparatus (30) when the visitor visits, a calling unit (13) calling a selected terminal apparatus among the plurality of terminal apparatuses (20), based on a collation result between the acquired visitor's authentication information and the registered authentication information of the scheduled visitor, and a registration unit (14) registering, in the scheduled visit database (11), the acquired visitor's authentication information in association with the user of the terminal apparatus (20), based on a response result of the terminal apparatus (20) for the call.

18 Claims, 9 Drawing Sheets

(56) References Cited

U.S. PATENT DOCUMENTS

2016/0284140 A1* 9/2016 Klein ................. G06Q 10/1095
2022/0124203 A1* 4/2022 White .................. H04M 3/566

FOREIGN PATENT DOCUMENTS

JP      2007-259367 A    10/2007
JP      2018-112945 A     7/2018

* cited by examiner

| USER INFORMATION | TERMINAL INFORMATION | | SCHEDULED VISIT INFORMATION | | AUTHENTICATION DATA |
|---|---|---|---|---|---|
| | TELEPHONE TERMINAL INFORMATION | INFORMATION TERMINAL INFORMATION | SCHEDULED VISIT DATE AND TIME | SCHEDULED VISITOR INFORMATION | |
| | | | | | |
| | | | | | |
| | | | | | |

Fig. 3

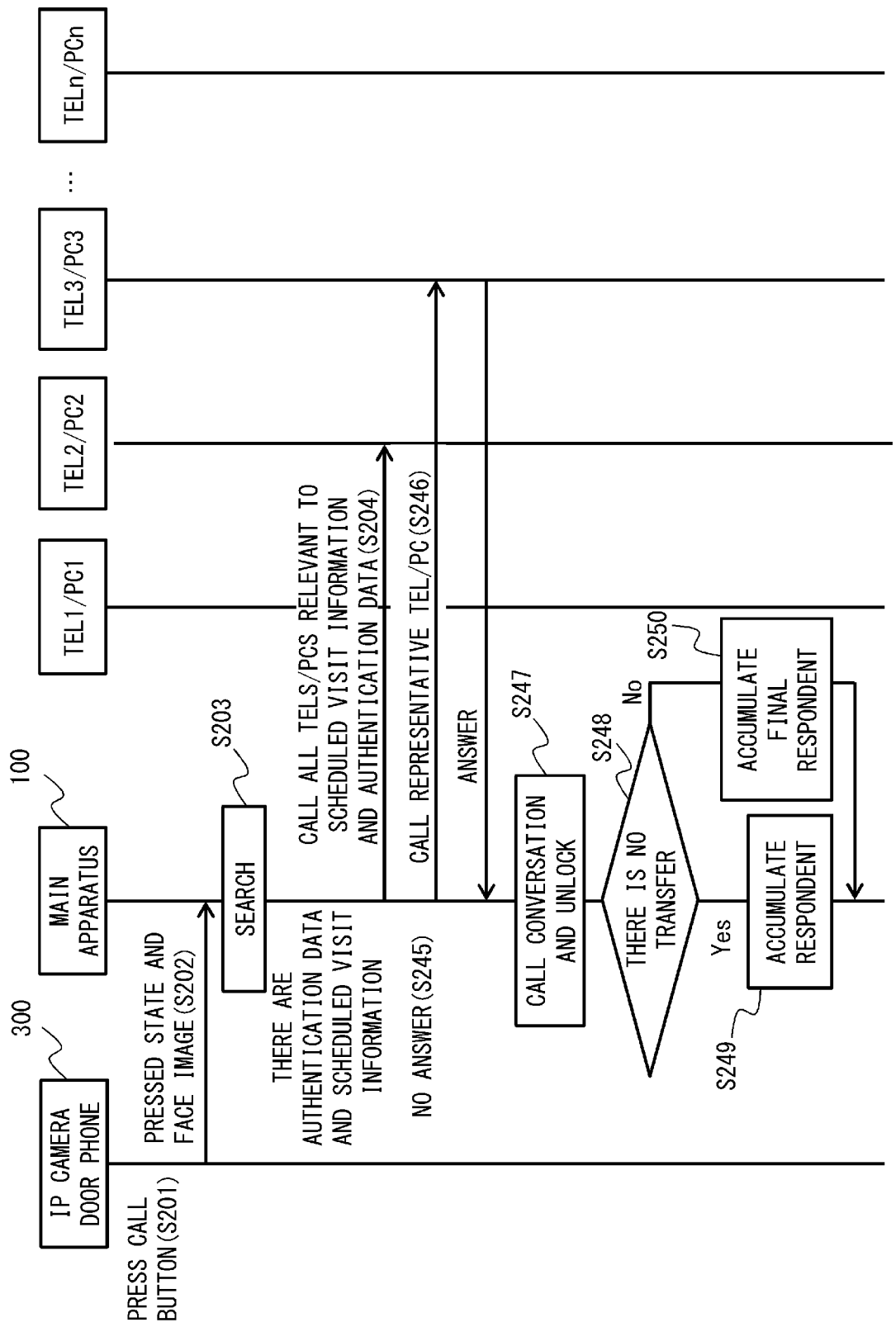

RECEPTION CONTROL APPARATUS, RECEPTION SYSTEM, CONTROL METHOD, AND CONTROL PROGRAM

This application is a National Stage Entry of PCT/JP2021/047330 filed on Dec. 21, 2021, which claims priority from Japanese Patent Application 2021-004627 filed on Jan. 15, 2021, the contents of all of which are incorporated herein by reference, in their entirety.

TECHNICAL FIELD

The present invention relates to a reception control apparatus, a reception system, a reception method, and a reception program.

BACKGROUND ART

A reception system is used in which a visitor is received by using a door phone or the like and a terminal such as a telephone set in an office or in a home is called. As for a call from a door phone, it is common to determine in advance terminals to be sounded, and cause all the target terminals to receive an incoming call. When an incoming call destination can be selectively sounded for each visitor, it is possible to prevent obstruction of business in an office or the like where there are many visitors. In addition, when a visitor can directly access a visit destination, the visitor can make a smooth visit without waiting.

As a related art, for example, Patent Literature 1 is known. Patent Literature 1 discloses "a face authentication intercom system in which face image data being registered in advance and face image data of a guest being captured by a camera-equipped door phone are collated, thereby it is determined who the guest is addressed to, a master unit to be called out among a plurality of existing master units is determined, and the master unit is called out".

CITATION LIST

Patent Literature

[Patent Literature 1] Japanese Unexamined Patent Application Publication No. 2007-259367

SUMMARY OF INVENTION

Technical Problem

According to the system described in Patent Literature 1, it is possible to call a terminal relevant to face image data of a visitor. However, in the system described in Patent Literature 1, it is necessary to register face image data for authentication in advance. Therefore, unless the face image data are registered, all of a plurality of existing terminals are called, and there is a problem that a terminal of a visit destination cannot be called appropriately.

In view of such a problem, an object of the present disclosure is to provide a reception control apparatus, a reception system, a reception method, and a reception program that are capable of appropriately calling a terminal without registering authentication information in advance.

Solution to Problem

A reception control apparatus according to the present disclosure is a reception control apparatus that accommodates a plurality of terminal apparatuses to be used by each of a plurality of users and a reception apparatus configured to receive a visitor, and includes: a scheduled visit database configured to be registered by associating authentication information of a scheduled visitor with the user; an acquisition unit configured to acquire authentication information of the visitor from the reception apparatus when the visitor visits; a calling unit configured to call a selected terminal apparatus among the plurality of terminal apparatuses, based on a result of collation between the acquired authentication information of the visitor and the registered authentication information of the scheduled visitor; and a registration unit configured to associate the acquired authentication information of the visitor with the user of the terminal apparatus, based on a response result of the terminal apparatus with respect to the call, and register the resultant authentication information in the scheduled visit database.

A reception system according to the present disclosure includes a plurality of terminal apparatuses to be used by each of a plurality of users, a reception apparatus configured to receive a visitor, and the above-described reception control apparatus.

A reception method according to the present disclosure is a reception method for the above-described reception control apparatus. A reception program according to the present disclosure is a reception program causing a computer to function as the above-described reception control apparatus.

Advantageous Effects of Invention

According to the present disclosure, it is possible to provide a reception control apparatus, a reception system, a reception method, and a reception program that are capable of appropriately calling a terminal without registering authentication information in advance.

BRIEF DESCRIPTION OF DRAWINGS

FIG. 3 is a diagram illustrating an example of data to be registered in a scheduled visit database in the first example embodiment;

FIG. 9 is a sequence diagram illustrating a specific example of the operation of the reception system according to the first example embodiment.

EXAMPLE EMBODIMENT

Figure 1:
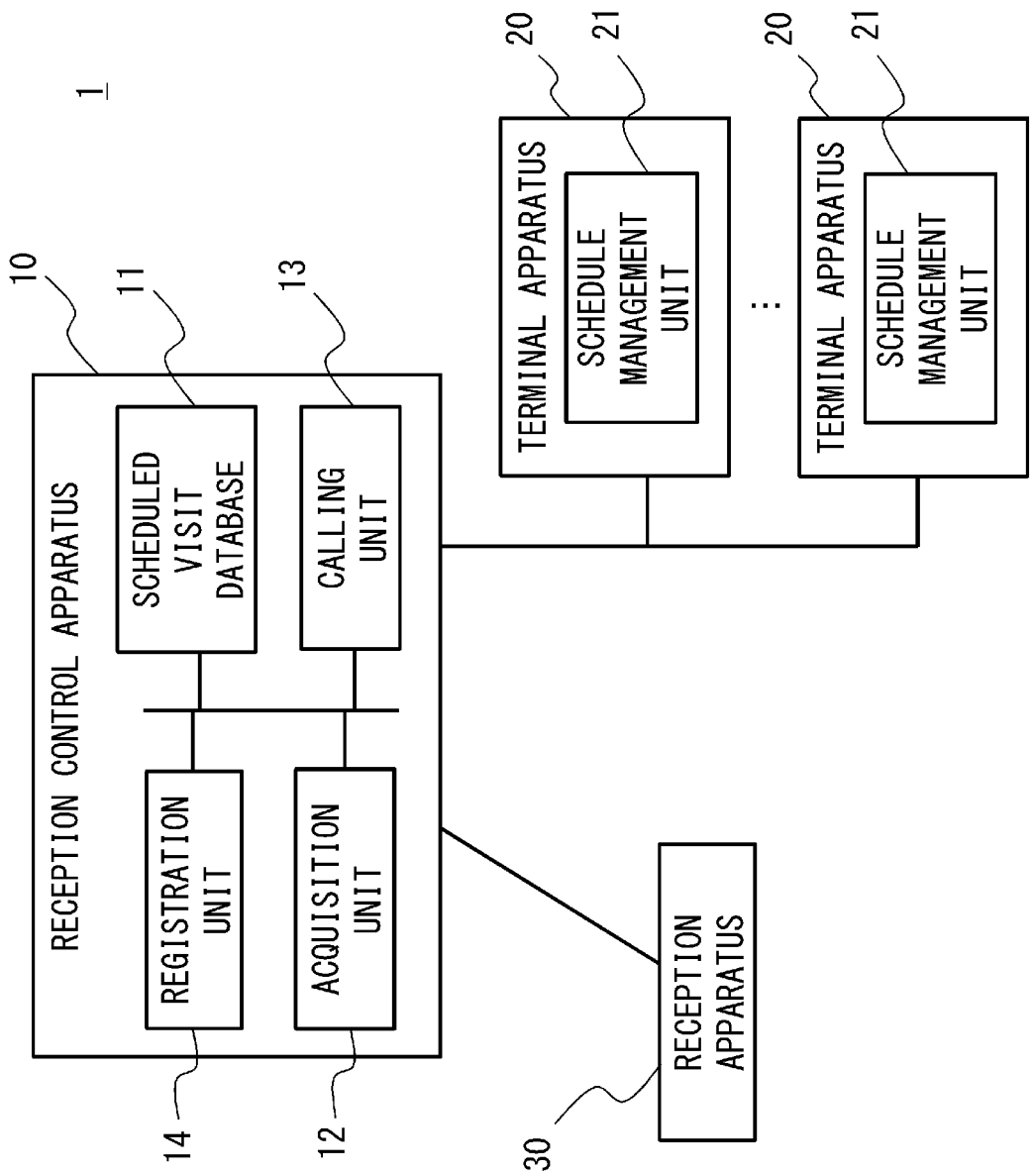
FIG. 1 is a configuration diagram illustrating an outline of a reception system according to an example embodiment.

Hereinafter, example embodiments will be explained with reference to the drawings. In the drawings, the same elements are denoted by the same reference numerals, and redundant descriptions are omitted as necessary.

Summary of Example Embodiment

FIG. 1 illustrates an outline of a reception system according to an example embodiment. As illustrated in FIG. 1, a reception system 1 according to the example embodiment includes a reception control apparatus 10, a plurality of terminal apparatuses 20, and a reception apparatus 30. The plurality of terminal apparatuses 20 are, for example, telephone terminals, information terminals, and the like, and are terminal apparatuses to be used by a plurality of users. The terminal apparatus 20 includes a schedule management unit 21 that manages a schedule of a user. The reception apparatus 30 is, for example, a door phone, an intercom, or the like, and is a reception apparatus that receives a visitor.

The reception control apparatus 10 is, for example, a main apparatus or the like of a telephone system, and accommodates a plurality of terminal apparatuses 20 and a reception apparatus 30. The reception control apparatus 10 includes a scheduled visit database 11, an acquisition unit 12, a calling unit 13, and a registration unit 14. The scheduled visit database 11 can register authentication information of a scheduled visitor in association with the user. Further, the scheduled visit database 11 may register scheduled visit information of the scheduled visitor and the authentication information of the scheduled visitor in association with the user. In this case, the registration unit 14 may acquire scheduled visit information of a scheduled visitor set in the schedule management unit 21 of the terminal apparatus 20, and register the acquired scheduled visit information in the scheduled visit database 11 in association with the user.

When a visitor visits, the acquisition unit 12 acquires authentication information of the visitor from the reception apparatus 30. The calling unit 13 calls a selected terminal apparatus among the plurality of terminal apparatuses 20, based on a result of collation between the acquired authentication information of the visitor and the registered authentication information of the scheduled visitor. Further, the calling unit 13 may call the selected terminal apparatus among the plurality of terminal apparatuses 20, based on a result of collation between a date and time when the visitor visits and the registered scheduled visit information of the scheduled visitor, and a result of collation between the acquired authentication information of the visitor and the registered authentication information of the scheduled visitor.

The registration unit 14 associates the acquired authentication information of the visitor with the user of the terminal apparatus 20, based on a result of response of the terminal apparatus 20 to the call, and registers the resultant authentication information in the scheduled visit database 11. The registration unit 14 may register a user of the terminal apparatus 20 finally responding to the call and the acquired authentication information of the visitor in association with each other.

As described above, in the related art, although the terminal can be selectively sounded by face authentication, face authentication information needs to be registered in advance, and face authentication information needs to be added to the system each time the number of new visitors increases. According to the example embodiment, since the authentication information is automatically registered in response to the result of the response to the call, the terminal can be appropriately called without registering the authentication information in advance.

In addition, in the related art, only a calling destination relevant to the face authentication information is designated, and for example, when there are a plurality of persons to be accepted, it is not possible to identify who the visitor actually comes to meet at that time, or an individual of a visit destination. Therefore, it is not possible to automatically and accurately sound selectively depending on who the visitor comes to meet. In the example embodiment, face authentication information is acquired every time there is a visitor, and the face authentication information is accumulated in association with the scheduled visitor information (name, company name, etc.) that is registered in the schedule management unit of the terminal apparatus, whereby it is possible to determine who a guest is addressed to, determine a terminal apparatus to be called from among a plurality of existing terminal apparatuses, and call an appropriate terminal apparatus even when the guest is not registered in advance.

First Example Embodiment

Hereinafter, a first example embodiment will be explained with reference to the drawings. As described above, in the related art, when a call button of a camera door phone is pressed, a person different from a person scheduled to accept a visitor is also called. According to the present example embodiment, there is provided a method of limiting (selectively sounding) a call destination from a door phone without being particularly conscious of an accepter by using a visitor acceptance schedule table and authentication (face, iris, or fingerprint) information which are stored in a main apparatus.

Figure 2:
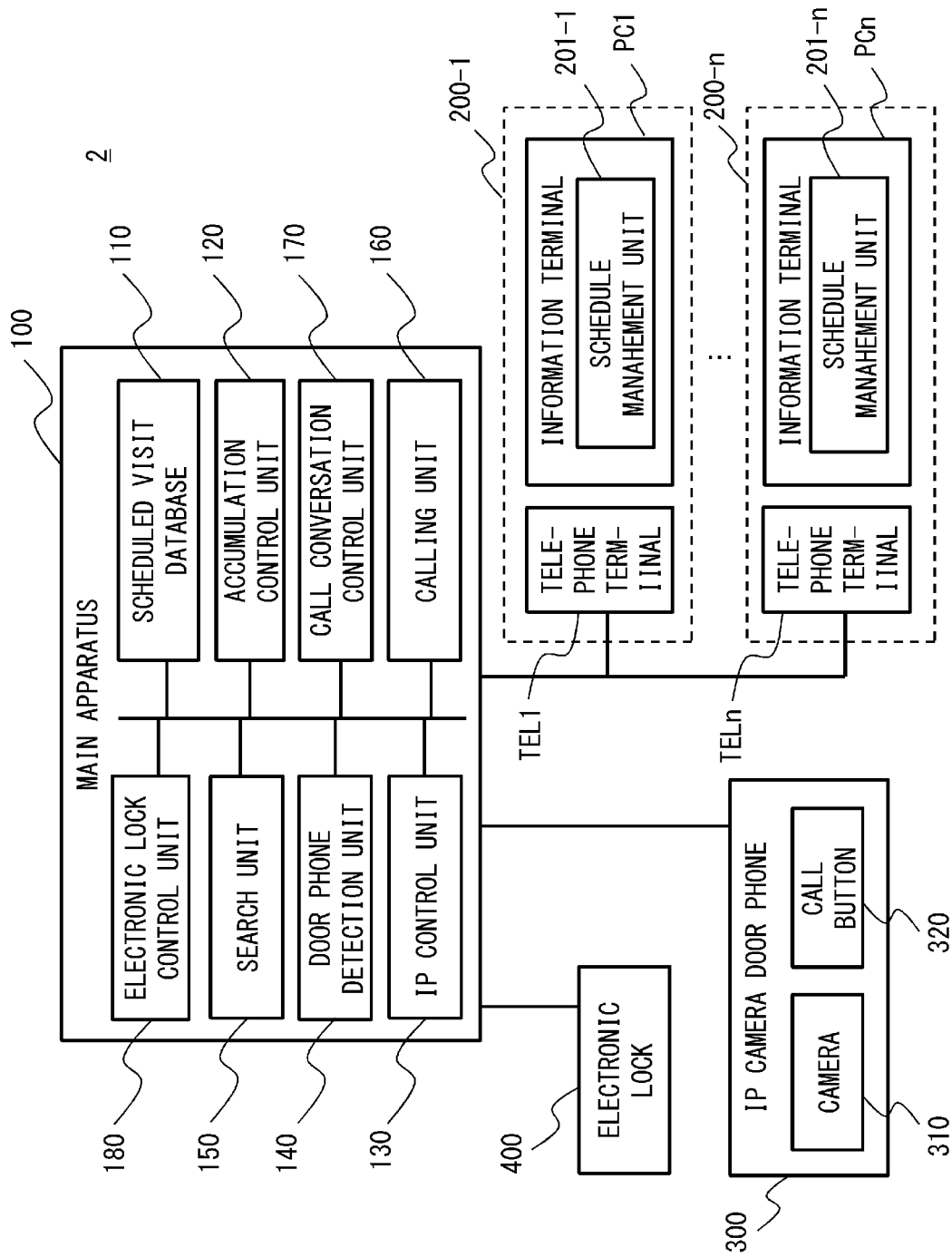
FIG. 2 is a configuration diagram illustrating an example of a configuration of a reception system according to a first example embodiment.

FIG. 2 illustrates an example of a configuration of a reception system according to the present example embodiment. As illustrated in FIG. 2, a reception system 2 according to the present example embodiment includes a main apparatus 100, a plurality of telephone terminals TEL (e.g., TEL1 to TELn), a plurality of information terminals PC (Personal Computers) (e.g., PC1 to PCn), an IP camera door phone 300, and an electronic lock 400.

Each of the plurality of telephone terminals TEL and the plurality of information terminals PC constitutes a plurality of terminal apparatuses 200 (e.g., 200-1 to 200-n) to be used by the users. The terminal apparatus 200 is an Internet Protocol (IP) door phone master unit that can be called from the IP camera door phone 300 and permits a call conversation. The telephone terminal TEL and the information terminal PC may be one apparatus or a plurality of apparatuses. Alternatively, either the telephone terminal TEL or the information terminal PC may be used as the terminal apparatus 200. The plurality of telephone terminals TEL and the plurality of information terminals PC are communicably connected to the main apparatus 100 via, for example, a Local Area Network (LAN) cable.

The telephone terminal TEL is an IP telephone such as a business phone. The telephone terminal TEL can answer (respond to) a call from the main apparatus 100 in response to a user's operation, and includes a microphone, a speaker, an operation unit, a display unit, and the like as necessary. The information terminal PC is an information processing apparatus such as a personal computer. Like the telephone terminal TEL, the information terminal PC can answer (respond to) a call from the main apparatus 100 in response to a user's operation, and includes a microphone, a speaker, an operation unit, a display unit, and the like as necessary. Further, the information terminal PC includes a schedule management unit 201 that manages a schedule (schedule table) of the user. The schedule management unit 201 is achieved by, for example, a schedule management application such as OUTLOOK (registered trademark) of Microsoft Corporation. The user inputs a schedule of a conference and a schedule of a visitor into the schedule management application, and the input schedules are set in the schedule management unit 201.

The IP camera door phone 300 is an IP door phone slave unit with a camera, and is a reception terminal that receives a visitor. For example, the IP camera door phone 300 is installed at a reception (entrance) of a building or an office. The IP camera door phone 300 is communicably connected to the main apparatus 100 via, for example, a LAN cable. The IP camera door phone 300 is not limited to a door phone, and may be an intercom or other reception apparatus. The IP camera door phone 300 includes a camera 310 that captures an image of a visitor's face, and a call button 320 that the visitor presses for calling. The IP camera door phone 300 has other functions necessary for a call conversation, such as a microphone, a speaker, and a display unit. The camera 310 is an example of a detection unit that detects authentication information of a visitor, and may detect not only a face image but also other authentication information such as biometric information (an iris or a fingerprint), a password, and IC card information of the visitor.

The electronic lock 400 unlocks or locks an entrance door in response to control from the main apparatus 100. For example, the electronic lock 400 is installed in an entrance door for entering a room from a reception of a building or an office. The electronic lock 400 is controllably connected to the main apparatus 100 via, for example, a control line.

The main apparatus 100 is a main equipment such as an IP telephone system that controls a call conversation or the like of a telephone set or a door phone to be accommodated, and is a reception control apparatus that controls reception of the door phone. The main apparatus 100 may also be others or a telephone switching apparatus such as an IP-Private Branch eXchange (IP-PBX). The main apparatus 100 accommodates a plurality of telephone terminals TEL, a plurality of information terminals PC, and an IP camera door phone 300 via an accommodation line, and further connects the electronic lock 400 via a control line.

The main apparatus 100 includes a scheduled visit database 110, an accumulation control unit 120, an IP control unit 130, a door phone detection unit 140, a search unit 150, a calling unit 160, a call conversation control unit 170, and an electronic lock control unit 180. The scheduled visit database 110 accumulates (registers) scheduled visit information and authentication data of visitors for each user (terminal apparatus). FIG. 3 illustrates an example of data accumulated in the scheduled visit database 110. As illustrated in FIG. 3, terminal information for identifying a terminal apparatus of a user, scheduled visit information indicating a schedule of a scheduled visitor, and authentication data of the scheduled visitor are registered in association with user information for identifying the user. The terminal information includes telephone terminal information for identifying a telephone terminal and information terminal information for identifying an information terminal. The scheduled visit information includes scheduled visitor information for identifying a scheduled visit date and time of a visitor and the scheduled visitor (name, company name, etc.). The authentication data are authentication data for authenticating a visitor. The authentication data are, for example, face image data, but may be biometric information such as an iris or a fingerprint, a password, or other authentication information such as IC card information.

The accumulation control unit (registration unit) 120 controls accumulation (registration) of data in the scheduled visit database 110. The accumulation control unit 120 periodically acquires a schedule table of the user from the schedule management unit 201 of the information terminal PC, and registers the scheduled visit information included in the schedule table in the scheduled visit database 110. In addition, the accumulation control unit 120 associates the user (and the scheduled visit information) finally responding to a call from the IP camera door phone 300 with face image data (authentication data) of the visitor acquired from the IP camera door phone 300, and accumulates the data in the scheduled visit database 110. Accordingly, it is possible to determine a target terminal (user) to be called by combining the scheduled visit information and the face authentication at the next visit. As described later, for example, in a case where a call is not transferred, a user responding to the call and the acquired face image data of the visitor may be registered in association with each other, and in a case where the call is transferred, a user finally responding to the call and the acquired face image data of the visitor may be registered in association with each other. Note that "responding to the call" means that the terminal apparatus answers (transmits an answer for) the call in response to the user's operation, and may further include the terminal apparatus making a call conversation with the IP camera door phone or unlocking the electronic lock. In addition, the transfer of the call may be performed by the terminal apparatus to another terminal apparatus in response to the user's operation, or may be performed to another terminal apparatus in a case where an answer is not received from the terminal apparatus called by the main apparatus.

The IP control unit 130 accommodates a plurality of telephone terminals TEL, a plurality of information terminals PC, and an IP camera door phone 300 that are connected via a LAN cable. The door phone detection unit (acquisition unit) 140 detects pressing of the call button 320 of the IP camera door phone 300, and acquires face image data (authentication data) of the visitor from the camera 310. The search unit 150 collates the face image data of the visitor acquired by the door phone detection unit 140 with the authentication data of the scheduled visitor in the scheduled visit database 110, and searches the scheduled visit database 110 for authentication data matching the acquired face image data.

The calling unit 160 calls the telephone terminal TEL and the information terminal PC and causes the terminals to receive an incoming call, based on the search result of the scheduled visit database 110. The calling unit 160 may call all the telephone terminals TEL and the information terminals PC when there is no relevant telephone terminal TEL and information terminal PC as a result of the search. The call conversation control unit 170 controls a call conversation between the telephone terminal TEL answering the call and the IP camera door phone 300. The electronic lock control unit 180 controls unlocking of the electronic lock 400 connected via a control line. The electronic lock control unit 180 may unlock the electronic lock 400 when the call conversation between the door phone and the telephone terminal or the information terminal is completed (ended), or may unlock the electronic lock 400 in response to an instruction from the telephone terminal or the information terminal.

Figure 4:
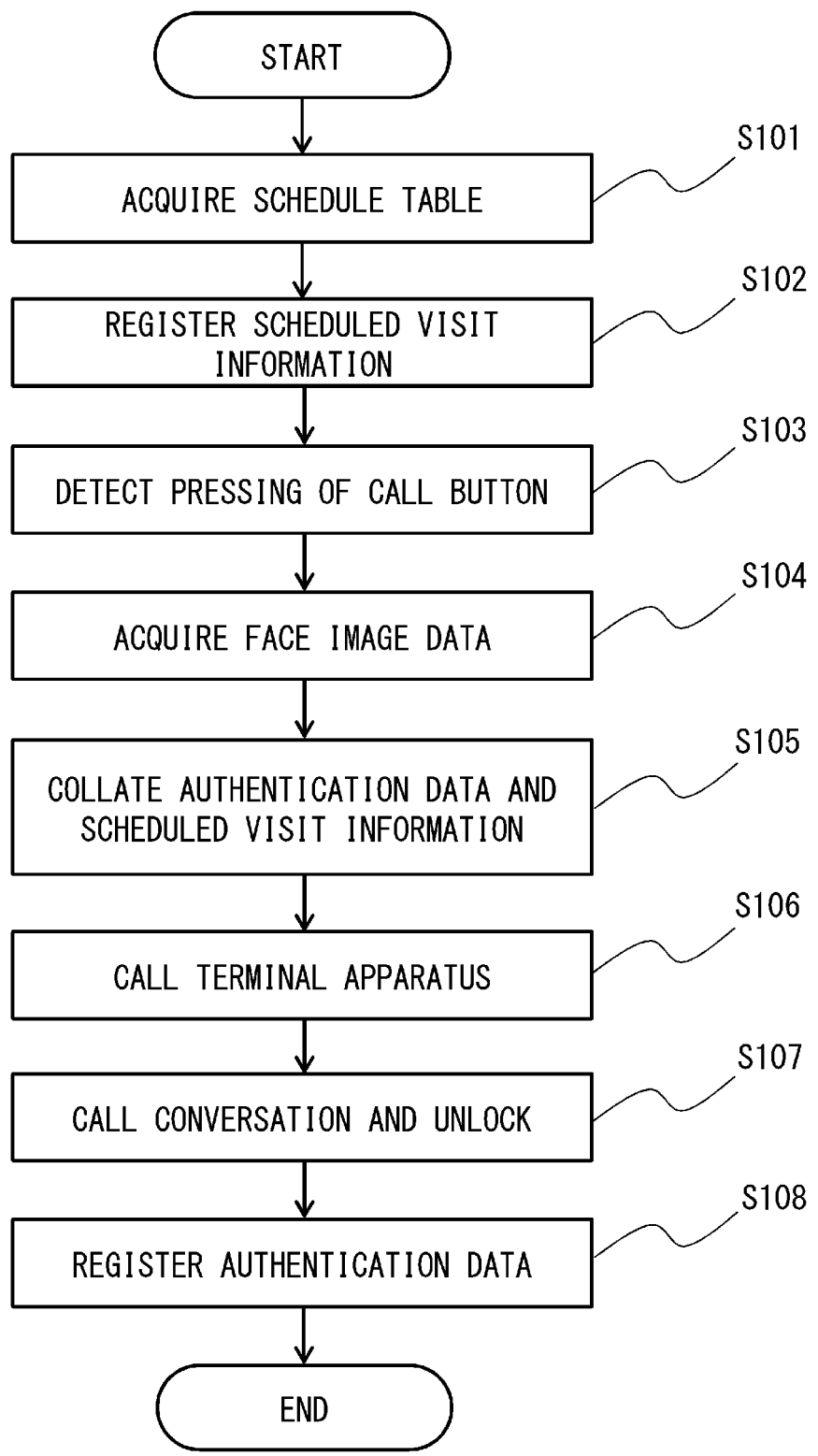
FIG. 4 is a flowchart illustrating an example of an operation of the reception system according to the first example embodiment.

Next, an operation (reception method) of the reception system according to the present example embodiment will be explained by using a flowchart of FIG. 4. As illustrated in FIG. 4, the main apparatus 100 acquires a schedule table in advance (S101) and registers scheduled visit information (S102). A user who accepts a visitor inputs a visit schedule of the visitor into a schedule table every time a schedule such as a meeting is determined in the schedule management unit 201 by the schedule management application of the information terminal PC. The accumulation control unit 120 periodically (e.g., about once per hour) acquires the schedule table from the schedule management unit 201 of the information terminal PC, extracts scheduled visit information including a scheduled visit date and time of the visitor from the schedule table, and accumulates the extracted scheduled visit information in the scheduled visit database 110.

Subsequently, the main apparatus 100 detects pressing of a call button (S103) and acquires face image data (S104). When the visitor visits the reception of the office and presses the call button 320 of the IP camera door phone 300, the camera 310 captures an image of the visitor's face, and a pressed state indicating that the call button 320 is pressed and the captured face image data are output from the IP camera door phone 300 to the IP control unit 130. Then, the door phone detection unit 140 of the main apparatus 100 detects the pressing of the call button 320 via the IP control unit 130, and acquires the face image data of the visitor captured by the camera 310.

Subsequently, the main apparatus 100 collates the authentication data and the scheduled visit information (S105), and calls the relevant terminal apparatus (S106). When the door phone detection unit 140 acquires the face image data of the visitor and outputs the face image data to the search unit 150, the search unit 150 collates the current time and face image data of the main apparatus 100 with the scheduled visit information and the authentication data accumulated in the scheduled visit database 110. The calling unit 160 determines a destination of the call, based on the collation result of the search unit 150, and calls only the target telephone terminal TEL and information terminal PC from the IP control unit 130.

Subsequently, the main apparatus 100 controls a call conversation/unlock (S107) and registers the authentication data (S108). When the called telephone terminal TEL and information terminal PC answer, the call conversation control unit 170 controls a call conversation between the telephone terminal TEL and the information terminal PC that have answered and the IP camera door phone 300. For example, when the call conversation is completed, the electronic lock control unit 180 unlocks the electronic lock 400. The accumulation control unit 120 associates the face image data of the visitor with the user finally responding to the visitor, and registers the data in the scheduled visit database 110.

Figure 5:
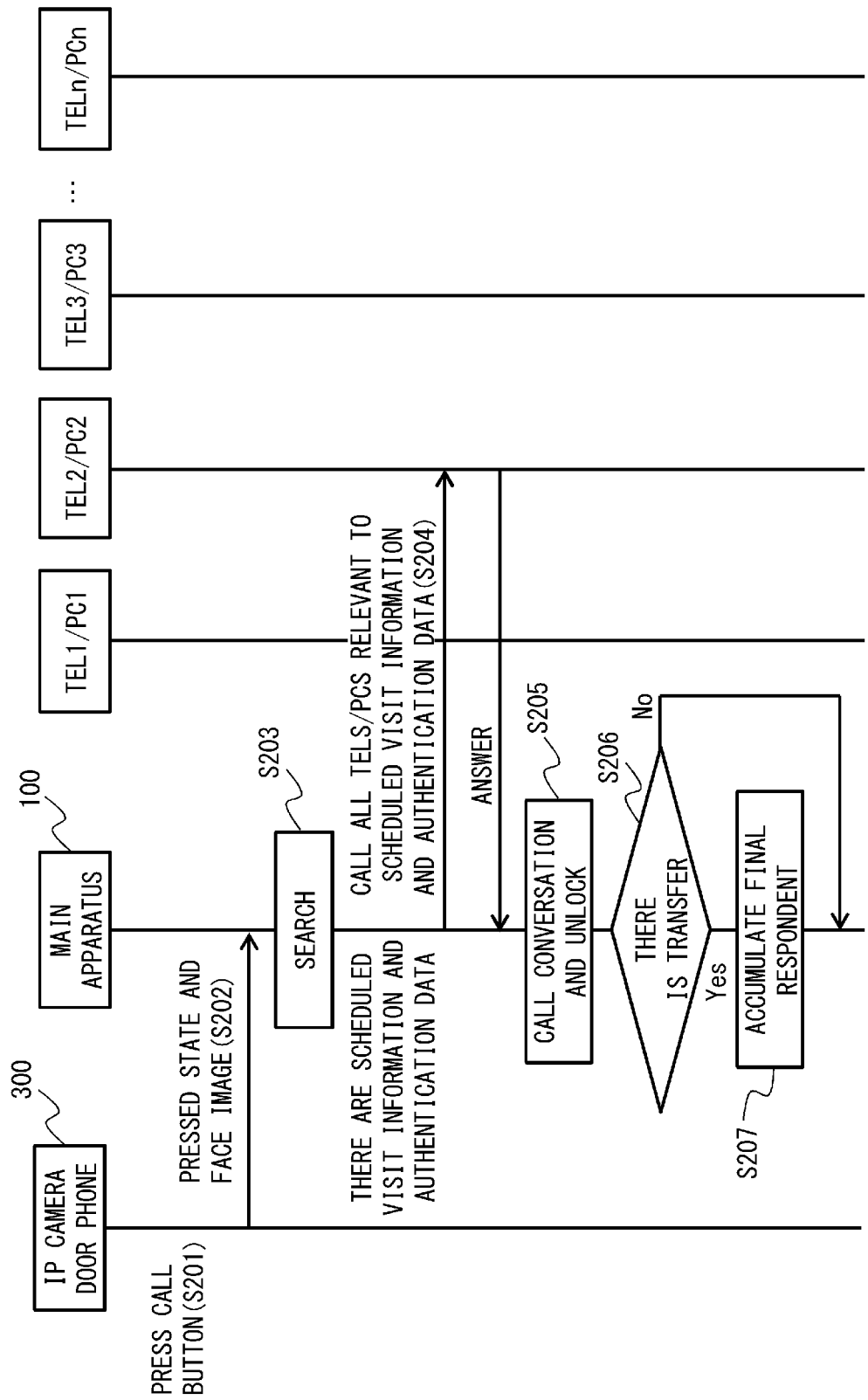
FIG. 5 is a sequence diagram illustrating a specific example of the operation of the reception system according to the first example embodiment.

Next, a specific example of the operation of the reception system according to the present example embodiment will be explained by using sequence diagrams of FIGS. 5 to 9. FIG. 5 illustrates an operation example in a case where there is scheduled visit information relevant to a target time, which is an aim of the present example embodiment, and there are also authentication data relevant to face image data. As described above, when a visitor presses the call button 320 of the IP camera door phone 300 (S201), the pressed state of the call button 320 and face image data are transmitted to the main apparatus 100 (S202), and the main apparatus 100 searches the scheduled visit database 110 for whether or not the scheduled visit information relevant to the current time and authentication data concerned to the face image data are registered (S203).

In the example of FIG. 5, it is determined that there are relevant scheduled visit information and the relevant authentication data as a result of the search. For example, in a case where a scheduled visit date and time of scheduled visit information of a user of a telephone terminal TEL2 and an information terminal PC2 coincides with the current time and authentication data of a scheduled visitor coincides with the face image data, the telephone terminal TEL2 and the information terminal PC2 are to be called. Then, the main apparatus 100 calls only the telephone terminal TEL2 and the information terminal PC2 associated with the relevant scheduled visit information and authentication data (S204). At this time, when there are a plurality of relevant telephone terminals TEL and information terminals PC, the main apparatus 100 calls all the relevant telephone terminals TEL and information terminals PC.

Subsequently, the main apparatus 100 controls a call conversation between the telephone terminal TEL or the information terminal PC that has answered the call and the IP camera door phone 300, and unlocks the electronic lock 400 (S205). Further, the main apparatus 100 determines whether or not the called incoming call has been transferred in order to determine the necessity of accumulating the authentication data (S206). For example, whether or not the call has been transferred is determined by the telephone terminal TEL or the information terminal PC that has finally answered (performed a call conversation).

When the incoming call is not transferred, i.e., when the called telephone terminal TEL or the information terminal PC answers, the data in the scheduled visit database 110 are not updated in particular once the call conversation is completed and the electronic lock is unlocked. For example, when the telephone terminal TEL2 and the information terminal PC2 are called and the telephone terminal TEL2 and the information terminal PC2 answer, the data in the scheduled visit database 110 are not updated. In addition, when the incoming call is transferred, i.e., when the called telephone terminal TEL or the information terminal PC and the telephone terminal TEL or the information terminal PC that has answered are different from each other, the main apparatus 100 accumulates, in the scheduled visit database 110, who has finally got in contact with the visitor (S207). In other words, the main apparatus 100 associates the user of the telephone terminal TEL or the information terminal PC who has finally answered with the face image data (authentication data) of the visitor, and registers the data in the scheduled visit database 110. For example, when the telephone terminal TEL2 and the information terminal PC2 are called, the call is transferred, and a telephone terminal TEL3 and an information terminal PC3 finally answer, the user of the telephone terminal TEL3 and the information terminal PC3 and the face image data of the visitor are associated with each other and registered in the scheduled visit database 110.

Figure 6:
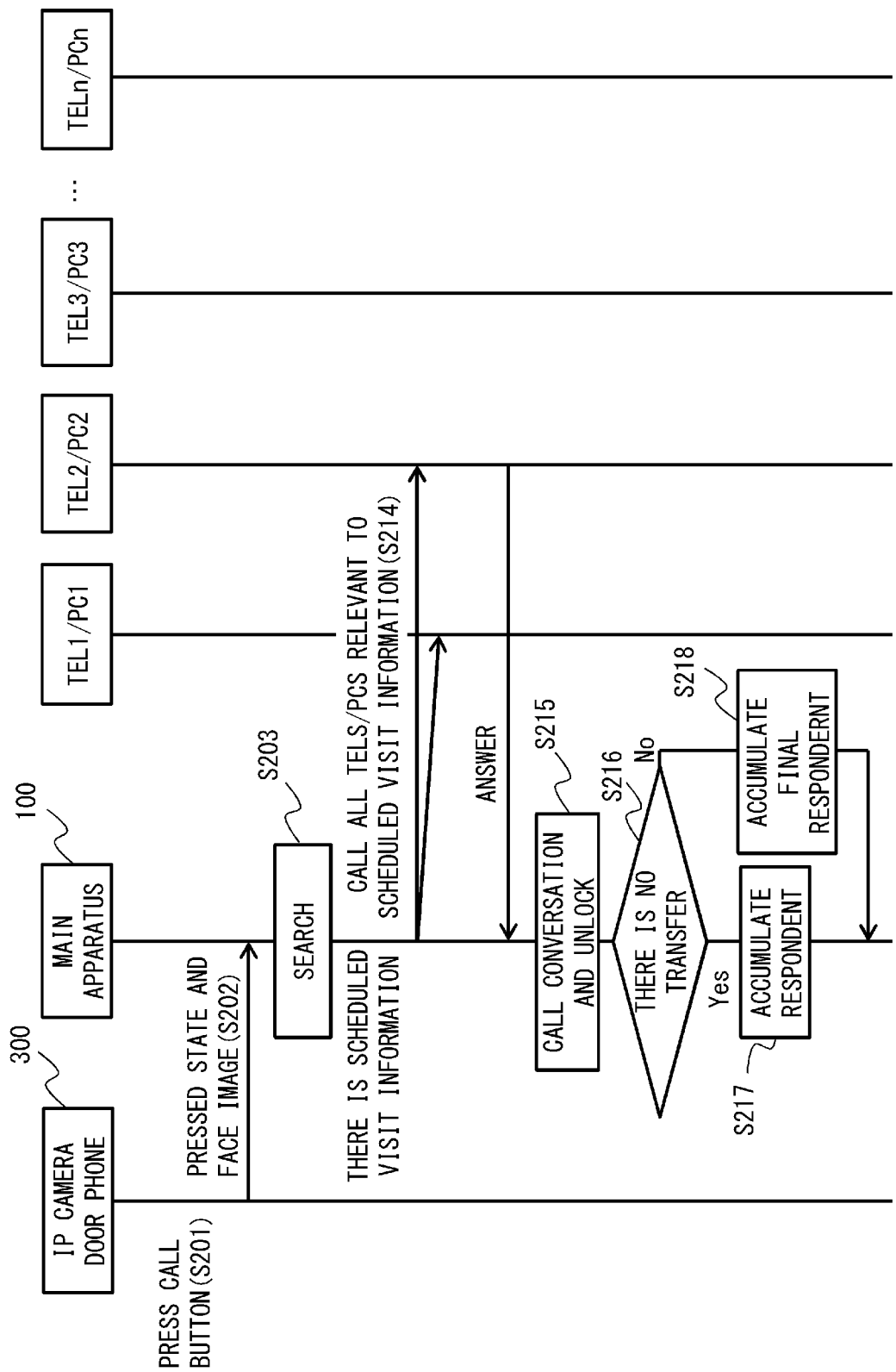
FIG. 6 is a sequence diagram illustrating a specific example of the operation of the reception system according to the first example embodiment.

FIG. 6 illustrates an operation example in a case where there is only scheduled visit information relevant to a target time and there is no authentication data relevant to the face image data. As in FIG. 5, when the call button 320 is pressed (S201), the main apparatus 100 searches the scheduled visit database 110 (S203). In the example of FIG. 6, as a result of the search, it is determined that there is only the relevant scheduled visit information. For example, in a case where the scheduled visit date and time of the scheduled visit information of the user of the telephone terminal TEL1 and the information terminal PC1 coincides with the current time and the scheduled visit date and time of the scheduled visit information of the user of the telephone terminal TEL2 and the information terminal PC2 coincides with the current time, the telephone terminal TEL1, the information terminal PC1, the telephone terminal TEL2, and the information terminal PC2 are to be called. Then, the main apparatus 100 calls the telephone terminal TEL1, the information terminal PC1, the telephone terminal TEL2, and the information terminal PC2 associated with the relevant scheduled visit information (S214). At this time, when there are only one relevant telephone terminal TEL and one information terminal PC, the main apparatus 100 calls only one telephone terminal TEL and one information terminal PC, and when there are a plurality of telephone terminals TEL and information terminals PC as in the present example, the main apparatus 100 calls all the relevant telephone terminals TEL and information terminals PC.

Subsequently, the main apparatus 100 controls a call conversation between the telephone terminal TEL or the information terminal PC that has answered the call and the IP camera door phone 300, and unlocks the electronic lock 400 (S215). Further, the main apparatus 100 determines whether or not the called incoming call has been transferred in order to determine a target of accumulation of the authentication data (S216).

When the incoming call is not transferred, i.e., when the called telephone terminal TEL or information terminal PC answers, the main apparatus 100 accumulates the acquired face image data in the scheduled visit database 110 in association with the respondent once the call conversation is completed and the electronic lock is unlocked (S217). For example, when the telephone terminal TEL1, the information terminal PC1, the telephone terminal TEL2, and the information terminal PC2 are called and the telephone terminal TEL2 and the information terminal PC2 answer, the user of the telephone terminal TEL2 and the information terminal PC2 and the face image data of the visitor are associated with each other and registered in the scheduled visit database 110. In addition, when the incoming call is transferred, i.e., when the called telephone terminal TEL or the information terminal PC and the telephone terminal TEL or the information terminal PC that has answered are different from each other, the main apparatus 100 accumulates, in the scheduled visit database 110, who has finally got in contact with the visitor (S218). In other words, the main apparatus 100 associates the user of the telephone terminal TEL or the information terminal PC that has finally answered with the face image data of the visitor, and registers the data in the scheduled visit database 110.

Figure 7:
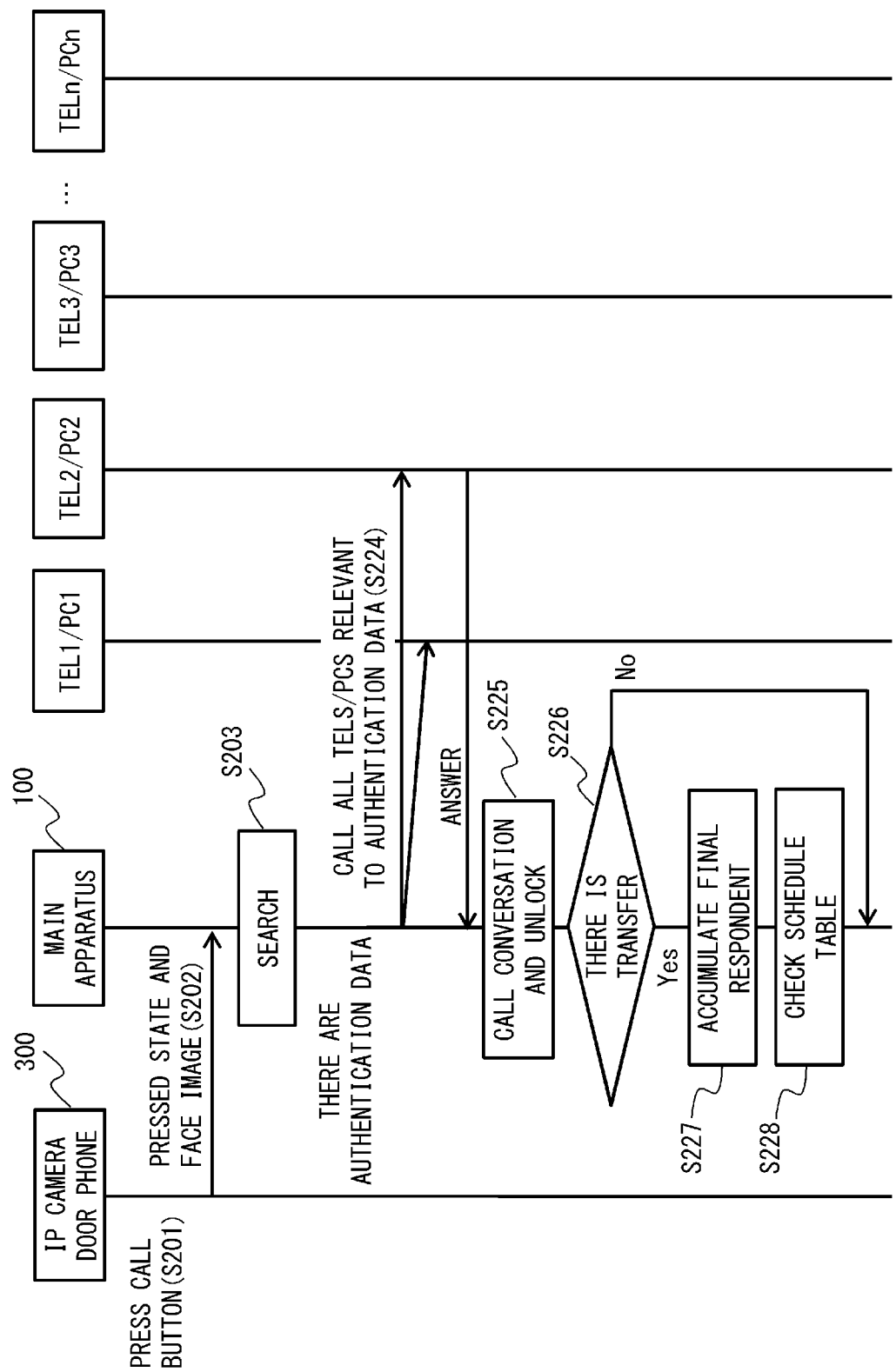
FIG. 7 is a sequence diagram illustrating a specific example of the operation of the reception system according to the first example embodiment.

FIG. 7 illustrates an operation example in a case where there is only authentication data relevant to face image data of a visitor and there is no scheduled visit information relevant to a target time. As in FIG. 5, when the call button 320 is pressed (S201), the main apparatus 100 searches the scheduled visit database 110 (S203). In the example of FIG. 7, it is determined that there are only relevant authentication data as a result of the search. For example, when authentication data of a scheduled visitor of the telephone terminal TEL1 and the information terminal PC1 coincides with the face image data of the visitor and authentication data of a scheduled visitor of the telephone terminal TEL2 and the information terminal PC2 coincides with the face image data of the visitor, the telephone terminal TEL1, the information terminal PC1, the telephone terminal TEL2, and the information terminal PC2 are to be called. Then, the main apparatus 100 calls the telephone terminal TEL1, the information terminal PC1, the telephone terminal TEL2, and the information terminal PC2 associated with the relevant authentication data (S224). When there are only one relevant telephone terminal TEL and one relevant information terminal PC, the main apparatus 100 calls only one telephone terminal TEL and one information terminal PC, and when there are a plurality of telephone terminals TEL and information terminals PC as in the present example, calls all the relevant telephone terminals TEL and information terminals PC.

Subsequently, the main apparatus 100 controls a call conversation between the telephone terminal TEL or the information terminal PC that has answered the call and the IP camera door phone 300, and unlocks the electronic lock 400 (S225). Further, the main apparatus 100 determines whether or not the called incoming call has been transferred in order to determine the necessity of accumulating the authentication data (S226).

When the incoming call is not transferred, i.e., when the called telephone terminal TEL or the information terminal PC answers, in particular, the data in the scheduled visit database 110 are not updated once the call conversation is completed and the electronic lock is unlocked. In addition, when the incoming call is transferred, i.e., when the called telephone terminal TEL or the information terminal PC and the telephone terminal TEL or the information terminal PC that has answered are different from each other, the main apparatus 100 accumulates, in the scheduled visit database 110, who has finally got in contact with the visitor (S227). In other words, the main apparatus 100 associates the user of the telephone terminal TEL or the information terminal PC that has finally answered with the face image data of the visitor, and registers the data in the scheduled visit database 110. Since association with the scheduled visit information is not possible at this time, the main apparatus 100 also checks the latest schedule table in consideration of a case where the update of the schedule table does not catch up (S228). When the schedule table has been updated, the scheduled visit information in the scheduled visit database 110 is updated. Further, when there is scheduled visit information that matches the current time, the scheduled visit information may be registered in association with the face image data.

Figure 8:
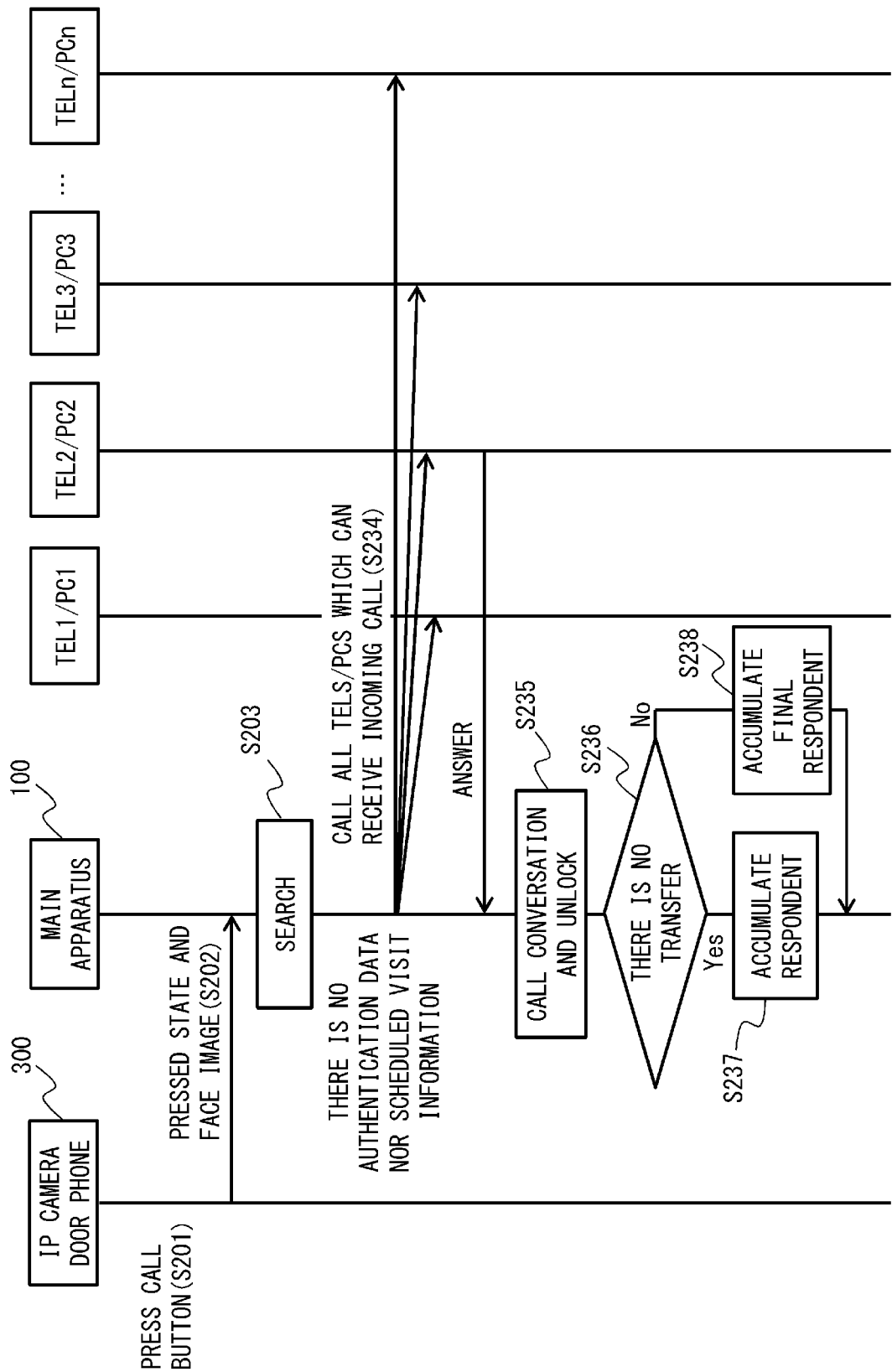
FIG. 8 is a sequence diagram illustrating a specific example of the operation of the reception system according to the first example embodiment.

FIG. 8 illustrates an operation example in a case where there is no scheduled visit information relevant to a target time and there is no authentication data relevant to the face image data. As in FIG. 5, when the call button 320 is pressed (S201), the main apparatus 100 searches the scheduled visit database 110 (S203). In the example of FIG. 8, as a result of the search, it is determined that there is no relevant scheduled visit information or authentication data. Then, the main apparatus 100 calls all the telephone terminals TEL and information terminals PC that can receive an incoming call (S234).

Subsequently, the main apparatus 100 controls a call conversation between a telephone terminal TEL or an information terminal PC that has answered the call and the IP camera door phone 300, and unlocks the electronic lock 400 (S235). Further, the main apparatus 100 determines whether or not the called incoming call has been transferred in order to determine a target of accumulation of the authentication data (S236).

When the incoming call is not transferred, i.e., when the called telephone terminal TEL or information terminal PC answers, once the call conversation is completed and the electronic lock is unlocked, the main apparatus 100 accumulates the acquired face image data in the scheduled visit database 110 in association with the respondent (S237). In addition, when the incoming call has been transferred, i.e., when the called telephone terminal TEL or information terminal PC and the telephone terminal TEL or the information terminal PC that has answered are different from each other, the main apparatus 100 accumulates, in the scheduled visit database 110, who has finally got in contact with the visitor (S238). In other words, the main apparatus 100 associates the user of the telephone terminal TEL or the information terminal PC that has finally answered with the face image data of the visitor, and registers the data in the scheduled visit database 110.

FIG. 9 illustrates an operation example in a case where there is scheduled visit information relevant to a target time and there are also authentication data relevant to the face image data, but an acceptor is absent. As in FIG. 5, when the call button 320 is pressed (S201), the main apparatus 100 searches the scheduled visit database 110 (S203).

In the example of FIG. 9, as a result of the search, it is determined that there are the relevant scheduled visit information and relevant authentication data. For example, in a case where the scheduled visit date and time of the scheduled visit information of the user of the telephone terminal TEL2 and the information terminal PC2 coincides with the current time and the authentication data of the scheduled visitor in the telephone terminal TEL2 and the information terminal PC2 coincides with the face image data, the telephone terminal TEL2 and the information terminal PC2 are to be called. Then, the main apparatus 100 calls only the telephone terminal TEL2 and the information terminal PC2 associated with the relevant scheduled visit information and the relevant authentication data (S204).

At this time, when there is no answer the call, or when the call button is pressed twice because there is no answer (S245), the main apparatus 100 calls representative telephone terminal TEL and information terminal PC (e.g., TEL3 and PC3) that are set in advance (S246).

Subsequently, the main apparatus 100 controls a call conversation between the telephone terminal TEL or the information terminal PC that has answered the call and the IP camera door phone 300, and unlocks the electronic lock 400 (S247). The main apparatus 100 determines whether or not the called incoming call has been transferred in order to determine a target of accumulation of the authentication data (S248).

When the incoming call is not transferred, i.e., when the called telephone terminal TEL or information terminal PC answers, once the call conversation is completed and the electronic lock is unlocked, the main apparatus 100 associates the acquired face image data with the respondent and accumulates the acquired face image data in the scheduled visit database 110 (S249). In addition, when the incoming call has been transferred, i.e., when the called telephone terminal TEL or information terminal PC and the telephone terminal TEL or the information terminal PC that has answered are different from each other, the main apparatus 100 accumulates, in the scheduled visit database 110, who has finally got in contact with the visitor (S250). In other words, the main apparatus 100 associates the user of the telephone terminal TEL or the information terminal PC that has finally answered with the face image data of the visitor, and registers the data in the scheduled visit database 110.

As described above, according to the present example embodiment, visitor information of each date and time is acquired from a schedule table such as OUTLOOK of each PC owner of the acceptance destination, associated with authentication information of a visitor, such as a face, iris, and fingerprint, and sequentially accumulated in the database in combination with the result of the collation with the final respondent's information, thereby improving accuracy and determining an accurate call destination.

According to the present example embodiment, since the face information of the visitor is sequentially accumulated in the database and is automatically updated, it is not necessary to register the authentication information in advance. Further, in addition to the authentication information, because of interlocking with a schedule table such as OUTLOOK, and updating from time to time who the visitor visits, and therefore, it is possible to accurately sound selectively. In other words, although the first visit is determined only by data of the schedule table, the second and subsequent visits can be collated in addition to the authentication information such as a face, and it is possible to distinguish based on scheduled acceptance of a plurality of the same-time visitors and acceptance experienced persons, thereby enabling to gradually increase the accuracy of selectively sounding.

Other Example Embodiments

In a case where a TEL (reception telephone) is placed at an entrance, face authentication may be performed when there is a camera, and fingerprint authentication may be performed when there is no camera. In this case, the number does not need to be dialed, and an incoming call can be automatically sent to a scheduled accepter. Further, when it is possible to associate with OUTLOOK, it may be interlocked with presence information, such as busy, even in a normal telephone incoming call. Furthermore, when a schedule is determined by a TEL or PC call conversation under the control of the main apparatus, the TEL number may also be associated and automatically incorporated into the schedule table by using speech recognition (such as detecting date and time information and enabling registration during the call conversation).

The present disclosure is not limited to the above-described example embodiments, and can be appropriately modified without departing from the scope of the present disclosure.

Each configuration in the above-described example embodiment is configured by hardware or software, or both, and may be configured by one hardware or software, or may be configured by a plurality of hardware or software. A function (processing) of each apparatus may be achieved by a computer having a CPU, a memory, or the like. For example, a program for performing a method according to the example embodiment may be stored in a storage device, and each function may be achieved by executing the program stored in the storage device by the CPU.

These programs can be stored by using various types of non-transitory computer readable media and supplied to a computer. The non-transitory computer readable media include various types of tangible storage media. Examples of the non-transitory computer readable media include magnetic recording media (e.g., flexible disks, magnetic tapes, hard disk drives), magneto-optical recording media (e.g., magneto-optical disks), CD-ROM (Read Only Memory), CD-R, CD-R/W, and semi-conductor memory (e.g., mask ROM, PROM (Programmable ROM), EPROM (Erasable PROM), flash ROM, RAM (random access memory)). The program may also be supplied to the computer by various types of transitory computer readable media. Examples of the transitory computer readable media include electrical signals, optical signals, and electromagnetic waves. The transitory computer readable medium can supply the program to the computer via a wired communication path such as an electric wire and an optical fiber, or a wireless communication path.

Some or all of the above-described example embodiments may be described as the following supplementary notes, but are not limited thereto.

(Supplementary Note 1)

A reception control apparatus accommodating a plurality of terminal apparatuses to be used by each of a plurality of users and a reception apparatus configured to receive a visitor, the reception control apparatus comprising:
  a scheduled visit database configured to be registered by associating authentication information of a scheduled visitor with the user;
  an acquisition unit configured to acquire authentication information of the visitor from the reception apparatus when the visitor visits;
  a call unit configured to call a selected terminal apparatus among the plurality of terminal apparatuses, based on a result of collation between the acquired authentication information of the visitor and the registered authentication information of the scheduled visitor; and
  a registration unit configured to associate the acquired authentication information of the visitor with the user of the terminal apparatus, based on a response result of the terminal apparatus with respect to the call, and register the authentication information in the scheduled visit database.

(Supplementary Note 2)

The reception control apparatus according to Supplementary note 1, wherein,
  when authentication information of a scheduled visitor relevant to the acquired authentication information of the visitor is registered, the calling unit calls a terminal apparatus of a user associated with the relevant authentication information of the scheduled visitor, and,
  when the call is transferred, the registration unit associates the acquired authentication information of the visitor with a user of a terminal apparatus finally responding to the call and registers the authentication information in the scheduled visit database.

(Supplementary Note 3)

The reception control apparatus according to Supplementary note 1 or 2, wherein,
  when authentication information of a scheduled visitor relevant to the acquired authentication information of the visitor is not registered, the calling unit calls all terminal apparatuses,
  when the call is not transferred, the registration unit associates the acquired authentication information of the visitor with a user of a terminal apparatus responding to the call and registers the authentication information in the scheduled visit database, and,
  when the call is transferred, the registration unit associates the acquired authentication information of the visitor with a user of a terminal apparatus finally responding to the call and registers the authentication information in the scheduled visit database.

(Supplementary Note 4)

The reception control apparatus according to any one of Supplementary notes 1 to 3, wherein
  the registration unit acquires scheduled visit information of the scheduled visitor being set in a schedule management unit configured to manage a schedule of the user in the terminal apparatus, and registers the acquired scheduled visit information in the scheduled visit database in association with the user, and
  the calling unit calls a selected terminal apparatus among the plurality of terminal apparatuses, based on a result of collation between a date and time of visit of the visitor and the registered scheduled visit information of the scheduled visitor, and a result of collation between the acquired authentication information of the visitor and the registered authentication information of the scheduled visitor.

(Supplementary Note 5)

The reception control apparatus according to Supplementary note 4, wherein,
  when scheduled visit information of a scheduled visitor relevant to a date and time of visit of the visitor is registered and when authentication information of a scheduled visitor relevant to the acquired authentication information of the visitor is registered, the calling unit calls a terminal apparatus of a user associated with the relevant scheduled visit information and authentication information of the scheduled visitor, and,
  when the call is transferred, the registration unit associates the acquired authentication information of the visitor with a user of a terminal apparatus finally responding to the call and registers the authentication information in the scheduled visit database.

(Supplementary Note 6)

The reception control apparatus according to Supplementary note 4 or 5, wherein,
  when the scheduled visit information of a scheduled visitor relevant to a date and time of visit of the visitor is registered, and when authentication information of a scheduled visitor relevant to the acquired authentication information of the visitor is not registered, the calling unit calls a terminal apparatus of a user associated with the relevant scheduled visit information of the scheduled visitor,
  when the call is not transferred, the registration unit associates the acquired authentication information of the visitor with a user of a terminal apparatus responding to the call and registers the authentication information in the scheduled visit database, and,
  when the call is transferred, the registration unit associates the acquired authentication information of the visitor with a user of a terminal apparatus finally responding to the call and registers the authentication information in the scheduled visit database.

(Supplementary Note 7)

The reception control apparatus according to any one of Supplementary notes 4 to 6, wherein,
  when authentication information of a scheduled visitor relevant to the acquired authentication information of the visitor is registered, and when scheduled visit information of a scheduled visitor relevant to a date and time of visit of the visitor is not registered, the calling unit calls a terminal apparatus of a user associated with the relevant authentication information of the scheduled visitor, and,
  when the call is transferred, the registration unit associates the acquired authentication information of the visitor with a user of a terminal apparatus finally responding to the call and registers the authentication information in the scheduled visit database.

(Supplementary Note 8)

The reception control apparatus according to any one of Supplementary notes 4 to 7, wherein,
  when scheduled visit information of a scheduled visitor relevant to a date and time of visit of the visitor is not registered, and when authentication information of a scheduled visitor relevant to the acquired authentication information of the visitor is not registered, the calling unit calls all terminal apparatuses, when the call is not transferred, the registration unit associates the acquired authentication information of the visitor with a user of a terminal apparatus responding to the call and registers the authentication information in the scheduled visit database, and, when the call is transferred, the registration unit associates the acquired authentication information of the visitor with a user of a terminal apparatus finally responding to the call and registers the authentication information in the scheduled visit database.

(Supplementary Note 9)

The reception control apparatus according to any one of Supplementary notes 1 to 8, wherein, when there is no answer to the call, the calling unit calls a representative terminal apparatus, when the call is not transferred, the registration unit associates the acquired authentication information of the visitor with a user of a terminal apparatus responding to the call and registers the authentication information in the scheduled visit database, and, when the call is transferred, the registration unit associates the acquired authentication information of the visitor with a user of a terminal apparatus finally responding to the call and registers the authentication information in the scheduled visit database.

(Supplementary Note 10)

A reception system comprising:
a plurality of terminal apparatuses to be used by each of a plurality of users;
a reception apparatus configured to receive a visitor; and
the reception control apparatus according to any one of Supplementary notes 1 to 9.

(Supplementary Note 11)

A reception method for the reception control apparatus according to any one of Supplementary notes 1 to 9.

(Supplementary Note 12)

A reception program causing a computer to function as the reception control apparatus according to any one of the Supplementary notes 1 to 9.

Although the present invention has been explained with reference to the example embodiments, the present invention is not limited to the above. Various modifications that can be understood by a person skilled in the art within the scope of the invention can be made to the configuration and details of the present invention.

This application is based upon and claims the benefit of priority from Japanese Patent Application No. 2021-004627 filed on Jan. 15, 2021, the disclosure of which is incorporated herein in its entirety by reference.

REFERENCE SIGNS LIST 1, 2 RECEPTION SYSTEM
10 RECEPTION CONTROL APPARATUS
11 SCHEDULED VISIT DATABASE
12 ACQUISITION UNIT
13 CALLING UNIT
14 REGISTRATION UNIT
20 TERMINAL APPARATUS
21 SCHEDULE MANAGEMENT UNIT
30 RECEPTION APPARATUS
100 MAIN APPARATUS
110 SCHEDULED VISIT DATABASE
120 ACCUMULATION CONTROL UNIT
130 IP CONTROL UNIT
140 DOOR PHONE DETECTION UNIT
150 SEARCH UNIT
160 CALLING UNIT
170 CALL CONVERSATION CONTROL UNIT
180 ELECTRONIC LOCK CONTROL UNIT
200 TERMINAL APPARATUS
201 SCHEDULE MANAGEMENT UNIT
300 IP CAMERA DOOR PHONE
310 CAMERA
320 CALL BUTTON
400 ELECTRONIC LOCK
PC INFORMATION TERMINAL
TEL TELEPHONE TERMINAL

What is claimed is:

1. A reception control apparatus accommodating a plurality of terminal apparatuses to be used by each of a plurality of users and a reception apparatus configured to receive a visitor, the reception control apparatus comprising:
a scheduled visit database configured to be registered by associating authentication information of a scheduled visitor with the user;
at least one memory that is configured to store instructions; and
at least one processor that is configured to execute the instructions to:
acquire authentication information of the visitor from the reception apparatus when the visitor visits;
call a selected terminal apparatus among the plurality of terminal apparatuses, based on a result of collation between the acquired authentication information of the visitor and the registered authentication information of the scheduled visitor; and
associate the acquired authentication information of the visitor with a user of the terminal apparatus, based on a response result of the terminal apparatus with respect to the call, and register the authentication information in the scheduled visit database,
wherein, when authentication information of a scheduled visitor relevant to the acquired authentication information of the visitor is registered, the processor executes the instructions to call a terminal apparatus of a user associated with the relevant authentication information of the scheduled visitor, and,
when the call is transferred, the processor executes the instructions to associate the acquired authentication information of the visitor with a user of a terminal apparatus finally responding to the call and register the authentication information in the scheduled visit database.

2. The reception control apparatus according to claim 1, wherein,
when authentication information of a scheduled visitor relevant to the acquired authentication information of the visitor is not registered, the processor executes the instructions to call all terminal apparatuses,
when the call is not transferred, the processor executes the instructions to associate the acquired authentication information of the visitor with a user of a terminal apparatus responding to the call and register the authentication information in the scheduled visit database, and,
when the call is transferred, the processor executes the instructions to associate the acquired authentication information of the visitor with a user of a terminal apparatus finally responding to the call and register the authentication information in the scheduled visit database.

3. The reception control apparatus according to claim 1, wherein processor executes the instructions to acquire scheduled visit information of the scheduled visitor being set to manage a schedule of the user in the terminal apparatus, and register the acquired scheduled visit information in the scheduled visit database in association with the user, and the processor executes the instructions to call a selected terminal apparatus among the plurality of terminal apparatuses, based on a result of collation between a date and time of visit of the visitor and the registered scheduled visit information of the scheduled visitor, and a result of collation between the acquired authentication information of the visitor and the registered authentication information of the scheduled visitor.

4. The reception control apparatus according to claim 3, wherein, when scheduled visit information of a scheduled visitor relevant to a date and time of visit of the visitor is registered and when authentication information of a scheduled visitor relevant to the acquired authentication information of the visitor is registered, the processor executes the instructions to call a terminal apparatus of a user associated with the relevant scheduled visit information and authentication information of the scheduled visitor, and, when the call is transferred, the processor executes the instructions to associate the acquired authentication information of the visitor with a user of a terminal apparatus finally responding to the call and registers the authentication information in the scheduled visit database.

5. The reception control apparatus according to claim 3, wherein, when scheduled visit information of a scheduled visitor relevant to a date and time of visit of the visitor is registered and when authentication information of a scheduled visitor relevant to the acquired authentication information of the visitor is not registered, the processor executes the instructions to call a terminal apparatus of a user associated with the relevant scheduled visit information of the scheduled visitor, when the call is not transferred, the processor executes the instructions to associate the acquired authentication information of the visitor with a user of a terminal apparatus responding to the call, and register the authentication information in the scheduled visit database, and, when the call is transferred, the processor executes the instructions to associate the acquired authentication information of the visitor with a user of a terminal apparatus finally responding to the call, and register the authentication information in the scheduled visit database.

6. The reception control apparatus according to claim 3, wherein, when authentication information of a scheduled visitor relevant to the acquired authentication information of the visitor is registered, and when scheduled visit information of a scheduled visitor relevant to a date and time of visit of the visitor is not registered, the processor executes the instructions to call a terminal apparatus of a user associated with the relevant authentication information of the scheduled visitor, and, when the call is transferred, the processor executes the instructions to associate the acquired authentication information of the visitor with a user of a terminal apparatus finally responding to the call and register the authentication information in the scheduled visit database.

7. The reception control apparatus according to claim 3, wherein, when scheduled visit information of a scheduled visitor relevant to a date and time of visit of the visitor is not registered, and when authentication information of a scheduled visitor relevant to the acquired authentication information of the visitor is not registered, the processor executes the instructions to call all terminal apparatuses, when the call is not transferred, the processor executes the instructions to associate the acquired authentication information of the visitor with a user of a terminal apparatus responding to the call, and register the authentication information in the scheduled visit database, and, when the call is transferred, the processor executes the instructions to associate the acquired authentication information of the visitor with a user of a terminal apparatus finally responding to the call and registers the authentication information in the scheduled visit database.

8. The reception control apparatus according to claim 1, wherein, when there is no answer to the call, the processor executes the instructions to call a representative terminal apparatus, when the call is not transferred, the processor executes the instructions to associate the acquired authentication information of the visitor with a user of a terminal apparatus responding to the call, and register the authentication information in the scheduled visit database, and, when the call is transferred, the processor executes the instructions to associate the acquired authentication information of the visitor with a user of a terminal apparatus finally responding to the call and register the authentication information in the scheduled visit database.

9. A reception system comprising:

a plurality of terminal apparatuses to be used by each of a plurality of users;

a reception apparatus configured to receive a visitor; and the reception control apparatus according to claim 1.

10. A control method for a reception control apparatus accommodating a plurality of terminal apparatuses to be used by each of a plurality of users and a reception apparatus configured to receive a visitor and comprising a scheduled visit database configured to be registered by associating authentication information of a scheduled visitor with the user, the control method comprising:

acquiring authentication information of the visitor from the reception apparatus when the visitor visits;

calling a selected terminal apparatus among the plurality of terminal apparatuses, based on a result of collation between the acquired authentication information of the visitor and the registered authentication information of the scheduled visitor; and associating the acquired authentication information of the visitor with a user of the terminal apparatus, based on a response result of the terminal apparatus with respect to the call, and registering the authentication information in the scheduled visit database, wherein, when authentication information of a scheduled visitor relevant to the acquired authentication information of the visitor is registered, calling a terminal apparatus of a user associated with the relevant authentication information of the scheduled visitor, and, when the call is transferred, associating the acquired authentication information of the visitor with a user of a terminal apparatus finally responding to the call and registering the authentication information in the scheduled visit database.

11. The control method according to claim 10, wherein, when authentication information of a scheduled visitor relevant to the acquired authentication information of the visitor is not registered, calling all terminal apparatuses, when the call is not transferred, associating the acquired authentication information of the visitor with a user of a terminal apparatus responding to the call and registering the authentication information in the scheduled visit database, and, when the call is transferred, associating the acquired authentication information of the visitor with a user of a terminal apparatus finally responding to the call and registering the authentication information in the scheduled visit database.

12. The control method according to claim 10, wherein, acquiring scheduled visit information of the scheduled visitor being set to manage a schedule of the user in the terminal apparatus, and registering the acquired scheduled visit information in the scheduled visit database in association with the user, and calling a selected terminal apparatus among the plurality of terminal apparatuses, based on a result of collation between a date and time of visit of the visitor and the registered scheduled visit information of the scheduled visitor, and a result of collation between the acquired authentication information of the visitor and the registered authentication information of the scheduled visitor.

13. The control method according to claim 12, wherein, when scheduled visit information of a scheduled visitor relevant to a date and time of visit of the visitor is registered and when authentication information of a scheduled visitor relevant to the acquired authentication information of the visitor is registered, calling a terminal apparatus of a user associated with the relevant scheduled visit information and authentication information of the scheduled visitor, and, when the call is transferred, associating the acquired authentication information of the visitor with a user of a terminal apparatus finally responding to the call and registering the authentication information in the scheduled visit database.

14. The control method according to claim 12, wherein, when scheduled visit information of a scheduled visitor relevant to a date and time of visit of the visitor is registered and when authentication information of a scheduled visitor relevant to the acquired authentication information of the visitor is not registered, calling a terminal apparatus of a user associated with the relevant scheduled visit information of the scheduled visitor, when the call is not transferred, associating the acquired authentication information of the visitor with a user of a terminal apparatus responding to the call, and registering the authentication information in the scheduled visit database, and, when the call is transferred, associating the acquired authentication information of the visitor with a user of a terminal apparatus finally responding to the call, and registering the authentication information in the scheduled visit database.

15. The control method according to claim 12, wherein, when authentication information of a scheduled visitor relevant to the acquired authentication information of the visitor is registered, and when scheduled visit information of a scheduled visitor relevant to a date and time of visit of the visitor is not registered, calling a terminal apparatus of a user associated with the relevant authentication information of the scheduled visitor, and, when the call is transferred, associating the acquired authentication information of the visitor with a user of a terminal apparatus finally responding to the call and registering the authentication information in the scheduled visit database.

16. The control method according to claim 12, wherein, when scheduled visit information of a scheduled visitor relevant to a date and time of visit of the visitor is not registered, and when authentication information of a scheduled visitor relevant to the acquired authentication information of the visitor is not registered, calling all terminal apparatuses, when the call is not transferred, associating the acquired authentication information of the visitor with a user of a terminal apparatus responding to the call, and registering the authentication information in the scheduled visit database, and, when the call is transferred, associating the acquired authentication information of the visitor with a user of a terminal apparatus finally responding to the call and registering the authentication information in the scheduled visit database.

17. The control method according to claim 10, wherein, when there is no answer to the call, calling a representative terminal apparatus, when the call is not transferred, associating the acquired authentication information of the visitor with a user of a terminal apparatus responding to the call, and registering the authentication information in the scheduled visit database, and, when the call is transferred, associating the acquired authentication information of the visitor with a user of a terminal apparatus finally responding to the call and registering the authentication information in the scheduled visit database.

18. A non-transitory computer readable medium storing a control program for causing a computer to execute the control method according to claim 10.

* * * * *